(12) United States Patent
Chen (10) Patent No.: US 9,796,059 B2
(45) Date of Patent: Oct. 24, 2017

(54) ADJUSTABLE VIBRATION ABSORPTION CUTTER HOLDER

(71) Applicant: Ching-Ting Chen, Taichung (TW)

(72) Inventor: Ching-Ting Chen, Taichung (TW)

(*) Notice: Subject to any disclaimer, the term of this patent is extended or adjusted under 35 U.S.C. 154(b) by 40 days.

(21) Appl. No.: 15/003,941

(22) Filed: Jan. 22, 2016

(65) Prior Publication Data

US 2017/0209973 A1 Jul. 27, 2017

(51) Int. Cl.
*B23Q 11/00* (2006.01)
*B23B 31/20* (2006.01)

(52) U.S. Cl.
CPC .......... *B23Q 11/0035* (2013.01); *B23B 31/20* (2013.01); *B23B 2222/92* (2013.01); *B23B 2250/16* (2013.01); *Y10T 408/76* (2015.01)

(58) Field of Classification Search
CPC ............ B23Q 11/0035; B23B 2250/16; Y10T 408/76; Y10T 409/304312
See application file for complete search history.

(56) References Cited

U.S. PATENT DOCUMENTS

| | | | | |
|---|---|---|---|---|
| 3,207,009 A | * | 9/1965 | Carlstedt | B23B 29/022 188/380 |
| 3,559,512 A | * | 2/1971 | Aggarwal | B23B 29/022 188/322.5 |
| 3,582,226 A | * | 6/1971 | Shurtliff | B23B 29/022 408/143 |
| 3,643,546 A | * | 2/1972 | Richter | B23Q 17/0976 279/129 |
| 4,605,349 A | * | 8/1986 | Bone | B23B 31/261 408/143 |
| 4,836,723 A | * | 6/1989 | Flammini | B23Q 1/70 279/129 |
| 5,030,047 A | * | 7/1991 | Pfalzgraf | B23B 31/1074 409/234 |
| 5,116,194 A | * | 5/1992 | Pfalzgraf | B23B 29/03414 408/143 |
| 5,775,857 A | * | 7/1998 | Johne | B23B 31/005 279/143 |
| 6,077,003 A | * | 6/2000 | Laube | B23B 31/006 279/103 |
| 7,029,209 B2 | * | 4/2006 | Cardemon | B23B 29/03403 408/1 R |
| 7,134,818 B2 | * | 11/2006 | Mazza' | B23B 31/08 408/56 |
| 8,322,952 B2 | * | 12/2012 | Tugend | B23B 29/03414 408/143 |

(Continued)

FOREIGN PATENT DOCUMENTS

DE 4110857 A1 * 10/1992 ........... B23B 31/006
FR 2545023 A1 * 11/1984 ........... B23B 31/265

*Primary Examiner* — Eric A Gates
(74) *Attorney, Agent, or Firm* — Withrow & Terranova, P.L.L.C.

(57) ABSTRACT

A cutter holder has a body and a buffering assembly. The body has a specific weight. The buffering assembly is mounted in the body and has a buffering unit and an elastic unit set. The buffering unit has a specific weight that is larger than the specific weight of the body. The buffering unit and the elastic unit set are utilized for absorbing vibration. The elastic unit set has multiple Belleville washers and can be changed in scales or amounts according to practical machining conditions.

8 Claims, 7 Drawing Sheets

(56) References Cited

U.S. PATENT DOCUMENTS

| | | | |
|---|---|---|---|
| 8,714,893 B2 * | 5/2014 | Taguchi | B23B 31/201 408/143 |
| 2016/0008892 A1 * | 1/2016 | Haimer | B23Q 11/0032 279/102 |

* cited by examiner

ADJUSTABLE VIBRATION ABSORPTION CUTTER HOLDER

BACKGROUND OF THE DISCLOSURE

1. Field of the Disclosure

The present disclosure relates to a machine tool, and more particularly to a cutter holder that can be adjusted in the capability of vibration absorption corresponding to the degree of vibration caused by machining.

2. Description of Related Art

Figure 7:
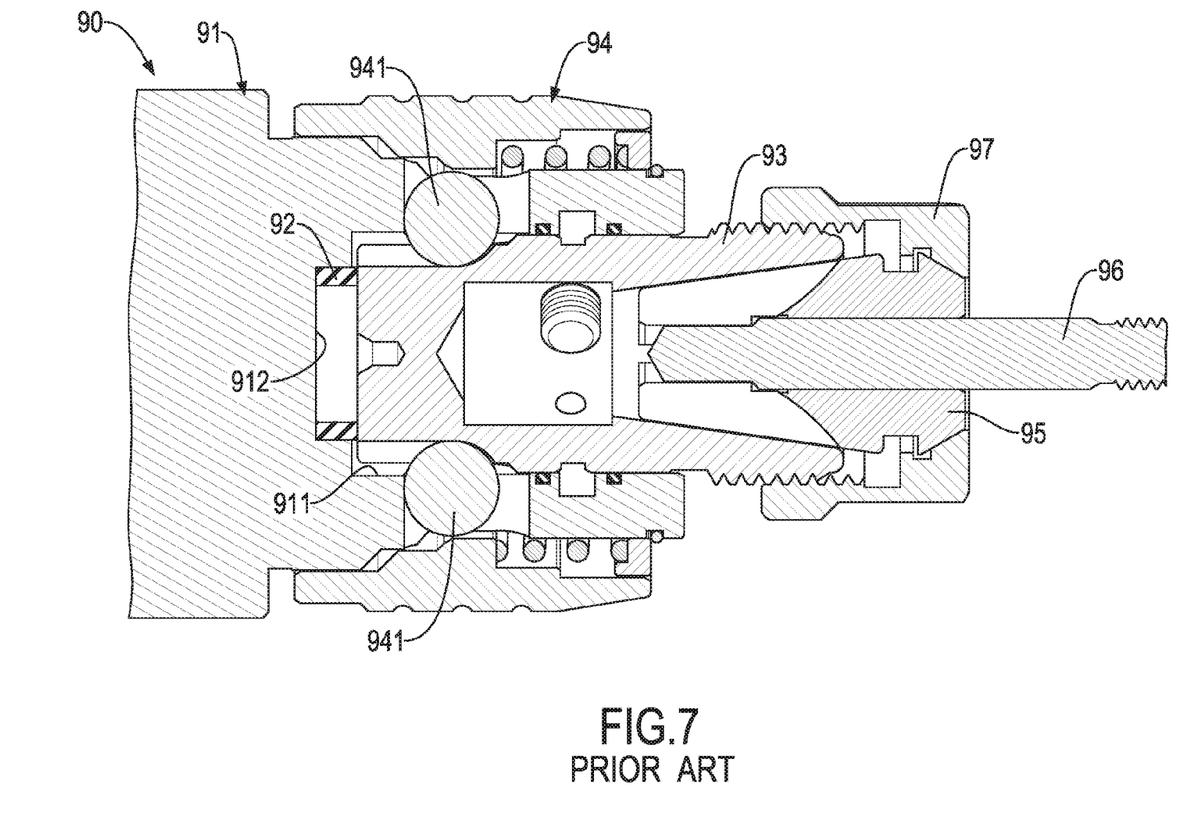
FIG. 7 is a cross sectional side view of a conventional cutter holder.

With the reference to FIG. 7, a conventional vibration absorption cutter holder 90 has a body 91, a buffering block 92, a collet fastening unit 93, a clamping set 94, a collet 95, a cutter 96, and a fastening cap 97. The body 91 has two opposite ends, a containing hole 911, and a positioning recess 912. The containing hole 911 is axially formed in the body 91. The positioning recess 912 axially communicates with the containing hole 911. The buffering block 92 is made of material with flexibility and is held in the positioning hole 912. The collet fastening unit 93 is held in the containing hole 911 and abuts against the buffering block 92. The clamping set 94 is assembled on the body 91 and has multiple clamping units 941. The collet fastening unit 93 is clamped by the multiple clamping units 941. The collet 95 is held in the collet fastening unit 93. The cutter 96 is held in the collet 95. The fastening cap 97 is screwed with the collet fastening unit 93 and abuts against the collet 95.

The conventional cutter holder 90 adopts the buffering block 92 with flexibility to absorb the vibration caused by machining and can achieve high quality machining, produce less noise, and prolong the service life of the cutter 96. However, the single buffering block 92 cannot be adjusted to fit with different practical machining conditions. Secondly, the buffering block 92 of the conventional cutter holder 90 is usually made of polyurethane and absorbs the power of vibration directly. The buffering block 92 deteriorates and hardens after use for a period time and loses the capability of vibration absorption.

To overcome the shortcomings of the conventional cutter holder, the present disclosure provides an adjustable vibration absorption cutter holder to mitigate or obviate the aforementioned problems.

SUMMARY OF THE DISCLOSURE

An exemplary objective of the present disclosure is to provide an adjustable vibration absorption cutter holder that can be adjusted according to the practical machining conditions.

The cutter holder comprises a body and a buffering assembly. The body has a specific weight. The buffering assembly is mounted in the body and has a buffering unit and an elastic unit set. The buffering unit has a specific weight that is larger than the specific weight of the body. The buffering unit and the elastic unit set are utilized for absorbing vibration. The elastic unit set has multiple Belleville washers and can be adjusted in specifications or amounts according to practical machining conditions.

Other objects, advantages, and novel features of the disclosure will become more apparent from the following detailed description when taken in conjunction with the accompanying drawings.

DETAILED DESCRIPTION OF PREFERRED EMBODIMENT

Figure 1:
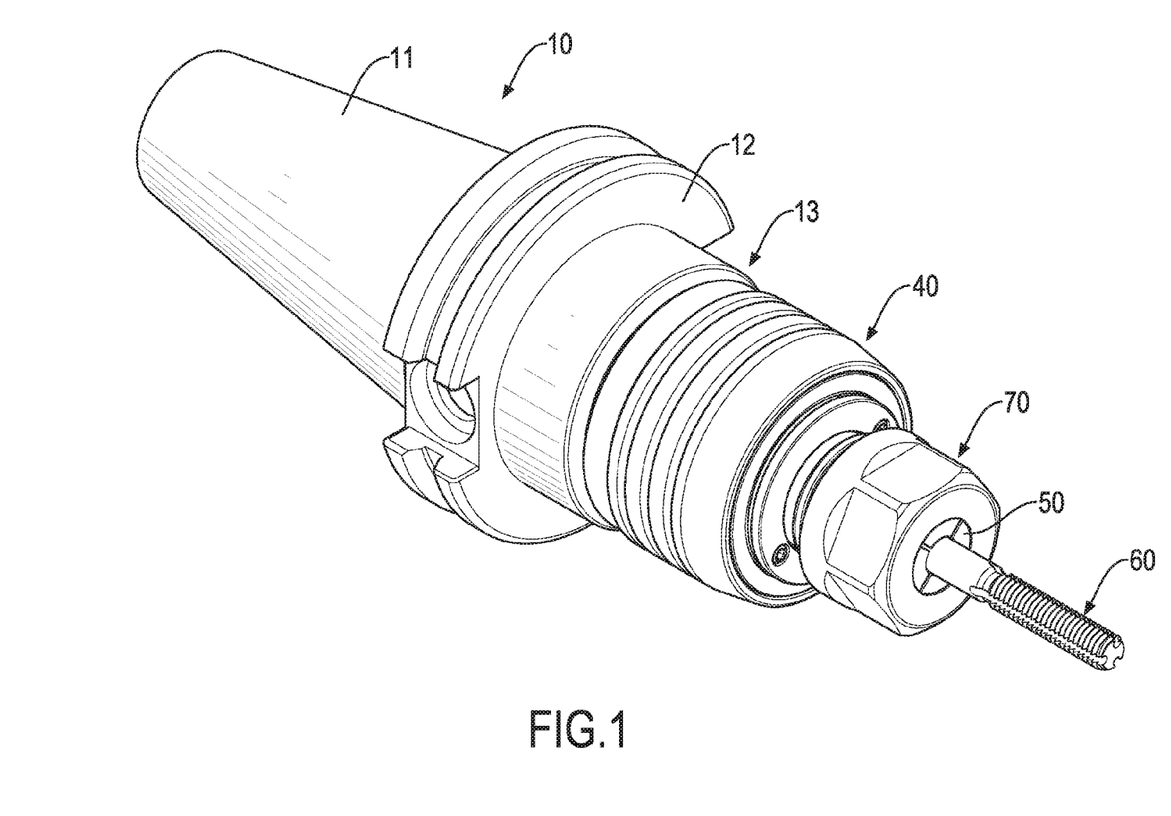
FIG. 1 is a perspective view of an adjustable vibration absorption cutter holder in accordance with an embodiment of the present disclosure.
Figure 2:
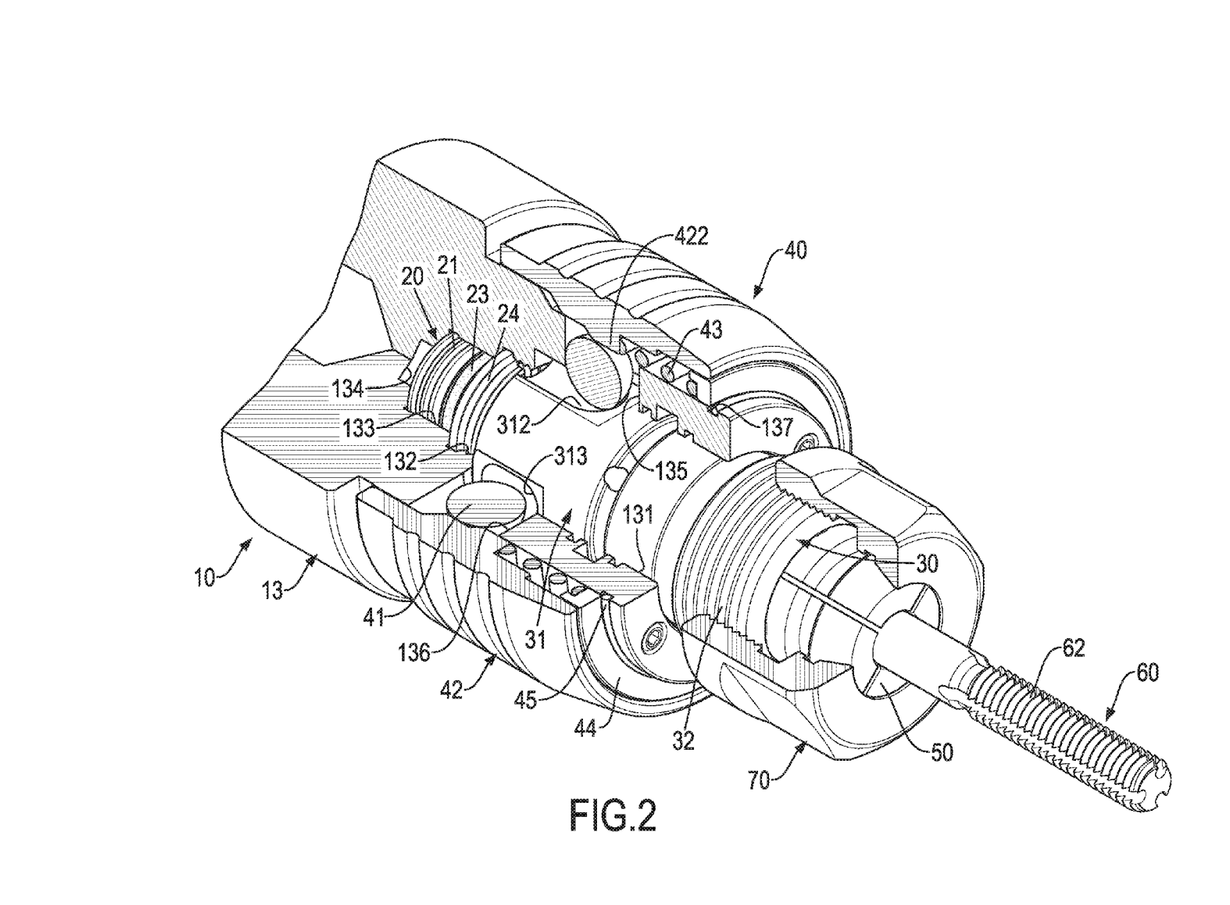
FIG. 2 is an enlarged perspective view in partial section of the cutter holder in FIG. 1.
Figure 3:
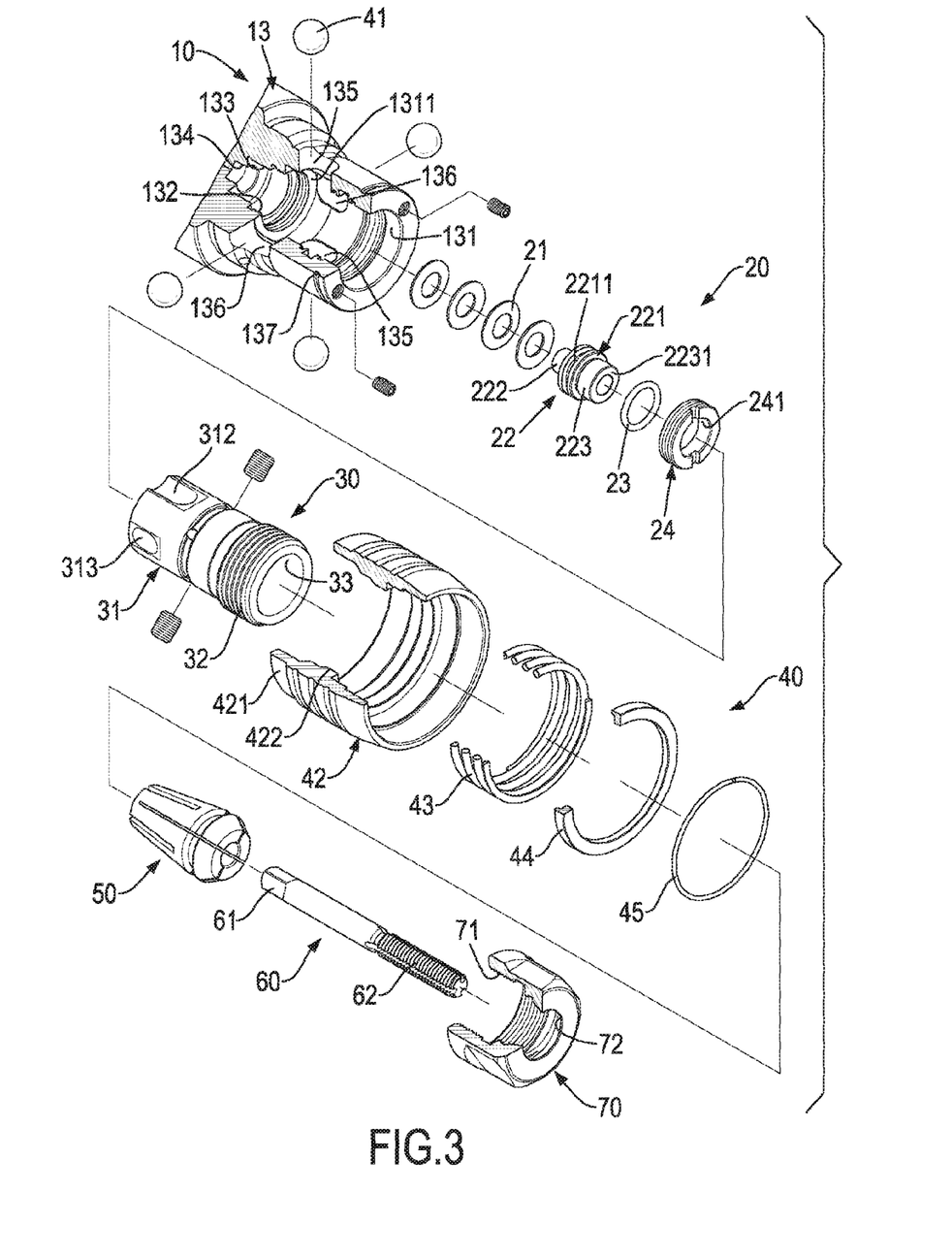
FIG. 3 is an exploded perspective view in partial section of the cutter holder in FIG. 1.

With reference to FIGS. 1, 2, and 3, an adjustable vibration absorption cutter holder in accordance with an embodiment of the present disclosure comprises a body 10, a buffering assembly 20, a collet fastening unit 30, a clamping set 40, a collet 50, a cutter 60, and a fastening cap 70. The buffering assembly 20 is mounted in the body 10. The collet fastening unit 30 and the clamping set 40 are mounted in the body 10. The collet 50 is held in the collet fastening unit 30. The cutter 60 is held in the collet 50. The fastening cap 70 is mounted on the collet fastening unit 30.

With reference to FIGS. 1, 2, and 3, the body 10 has a specific weight, a connecting section 11, an abutting rim 12, and an assembling section 13. The connecting section 11 has two opposite ends. The abutting rim 12 is axially connected to one of the ends of the connecting section 11. The assembling section 13 has a peripheral surface, a first end, a second end, a containing hole 131, a fastening hole 132, a receiving hole 133, a positioning recess 134, two first through holes 135, two second through holes 136, and a ring groove 137. The first end of the assembling section 13 is axially connected to the abutting rim 12. The second end of the assembling section 13 is opposite the first end of the assembling section 13.

With reference to FIGS. 1, 2, and 3, the containing hole 131 is axially formed in the assembling section 13 and has a terminal face 1311 away from the second end of the assembling section 13. The fastening hole 132 is axially defined in a bottom of the containing hole 131 and communicates with the containing hole 131. The fastening hole 132 has an inner surface and a thread formed on the inner surface of the fastening hole 132. The receiving hole 133 is axially defined in a bottom of the fastening hole 132 and communicates with the fastening hole 132. The positioning recess 134 is axially defined in a bottom of the receiving hole 133 and communicates with the receiving hole 133. The two first through holes 135 and the two second through holes 136 are defined in the peripheral surface at equal angular intervals. The two first through holes 135 are diametrically opposite each other, and each first through hole 135 is radially defined in the assembling section 13 and communicates with the containing hole 131. The two second through holes 136 are diametrically opposite each other, and each second through hole 136 is radially defined in the assembling section 13 and communicates with the containing hole 131. The ring groove 137 is annularly formed in the peripheral surface and is adjacent to the second end of the assembling section 13.

Figure 4:
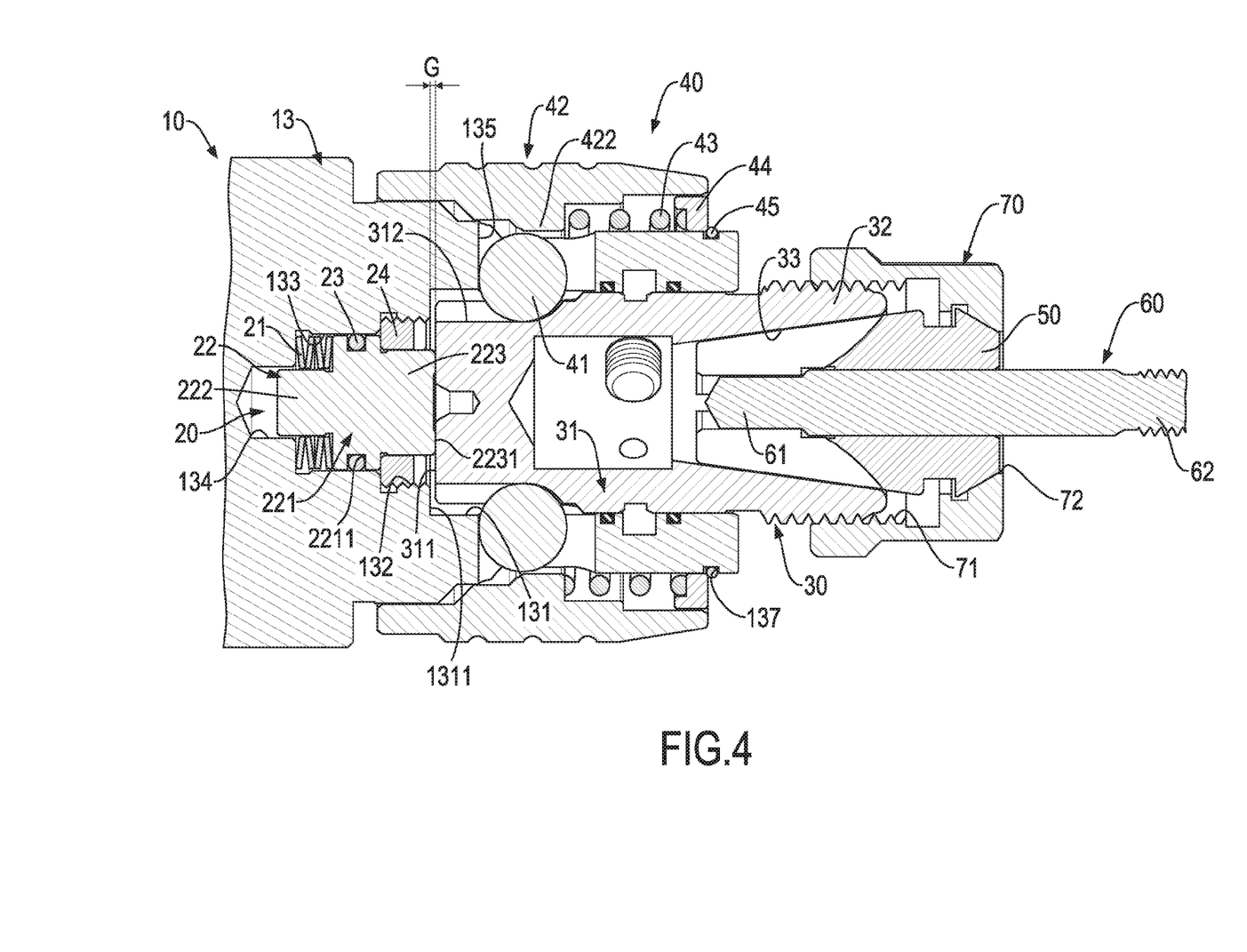
FIG. 4 is a cross sectional side view of the cutter holder in FIG. 1.
Figure 6:
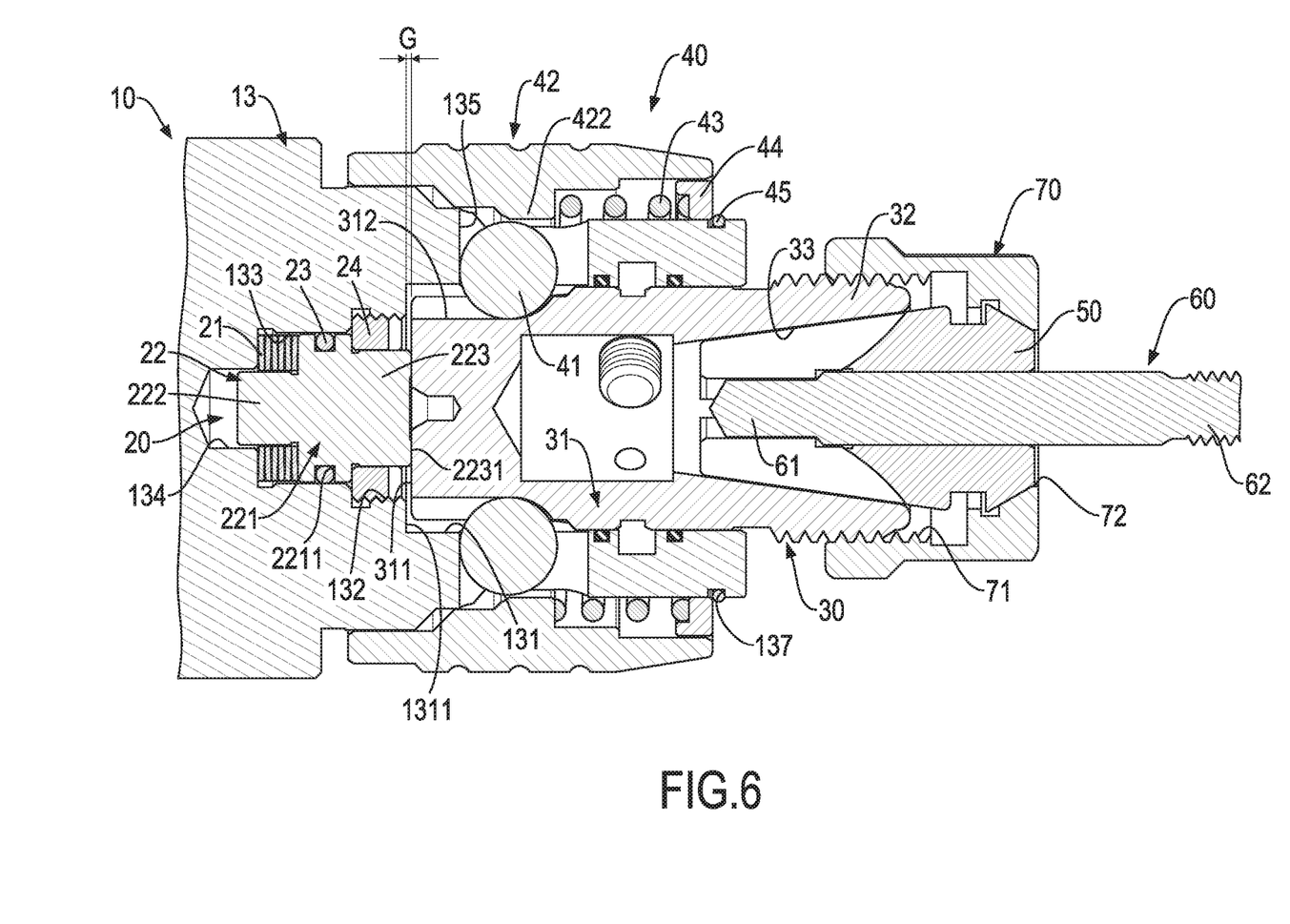
FIG. 6 is another cross sectional side view of the cutter holder in FIG. 1.

With reference to FIGS. 2, 3, and 4, the buffering assembly 20 is mounted in the body 10 and abuts the body 10. The buffering assembly 20 has an elastic unit set 21, a buffering unit 22, an O-ring 23, and a restricting unit 24. The elastic unit set 21 is received in the receiving hole 133 and has multiple Belleville washers. The multiple Belleville washers are implemented as four in amount. The four Belleville washers are divided into two pairs, and each pair has two Belleville washers. The two Belleville washers of each pair are arranged in opposite directions. The specifications or amounts of the Belleville washers can be changed to achieve different degrees of vibration absorption corresponding to different tapping situations. With reference to FIG. 6, the amount of the Belleville washers may be implemented as six.

With reference to FIGS. 2, 3, and 4, the buffering unit 22 is held in the receiving hole 133 and has a specific weight, a middle portion 221, a positioning shaft 222, and an abutting shaft 223. The specific weight of the buffering unit 22 is larger than the specific weight of the body 10, and more particularly, the buffering unit 22 is made of tungsten alloy. The middle portion 221 has a peripheral surface, two opposite side faces, and a receiving groove 2211. The receiving groove 2211 is annularly defined in the peripheral surface of the middle portion 221. The positioning shaft 222 is axially connected with one of the side faces of the middle portion 221. The abutting shaft 223 is axially connected with the other side face of the middle portion 221 and has a shaft end face 2231 away from the middle portion 221. The positioning shaft 222 is mounted through the four Belleville washers and extends in the positioning recess 134 of the assembling section 13. The middle portion 221 is received in the receiving hole 133 and abuts against the elastic unit set 21. The abutting shaft 223 is mounted through the fastening hole 132 of the assembling section 13 and extends to the containing hole 131 of the assembling section 13. A gap G is formed between the shaft end face 2231 of the abutting shaft 223 and the terminal face 1311 of the containing hole 131. The O-ring 23 is mounted in the receiving groove 2211 of the middle portion 221 and abuts against an inner surface of the receiving hole 133.

With reference to FIGS. 2, 3, and 4, the restricting unit 24 is mounted around the abutting shaft 223 of the buffering unit 22, is screwed in the fastening hole 132 of the assembling section 13, and abuts against the middle portion 221 of the buffering unit 22. The restricting unit 24 has a peripheral surface, a thread, and a through hole 241. The thread of the restricting unit 24 is formed around the peripheral surface of the restricting unit 24. The through hole 241 is axially defined through the restricting unit 24.

Figure 5:
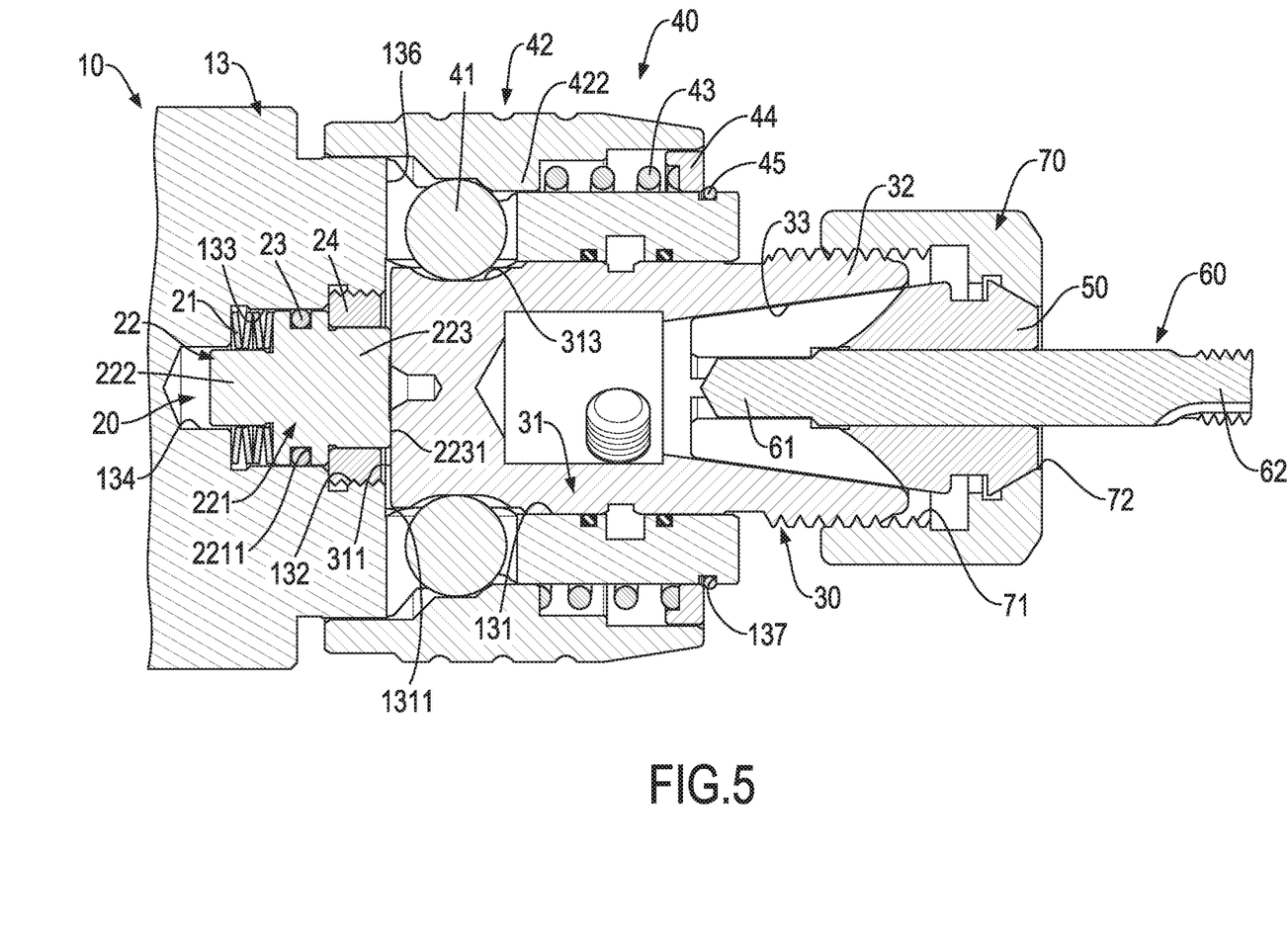
FIG. 5 is another cross sectional side view of the cutter holder in FIG. 1.

With reference to FIGS. 3, 4, and 5, the collet fastening unit 30 has a first end, a second end, a clamping portion 31, a fastening portion 32, and a collet receiving hole 33. The first end and the second end of the collet fastening unit 30 are opposite each other. The clamping portion 31 is disposed at the first end of the collet fastening unit 30, is held in the containing hole 131 of the assembling section 13, abuts against the shaft end face 2231 of the abutting shaft 223, and has a peripheral surface, an end face 311, two first recesses 312, and two second recesses 313. The end face 311 of the clamping portion 31 and the terminal face 1311 of the containing hole 131 of the assembling section 13 are spaced apart by the gap G. The two first recesses 312 and the two second recesses 313 are formed in the peripheral surface of the clamping portion 31 at equal angular intervals. The two first recesses 312 are diametrically opposite each other, and each first recess 312 is formed in the peripheral surface of the clamping portion 31 and extends to the first end of the collet fastening unit 30. The two first recesses 312 of the clamping portion 31 respectively correspond in position to the two first through holes 135 of the assembling section 13. The two second recesses 313 are diametrically opposite each other, and each second recess 313 is radially defined in the peripheral surface of the clamping portion 31. The two second recesses 313 of the clamping portion 31 respectively correspond in position to the two second through holes 136 of the assembling section 13.

With reference to FIGS. 3, 4, and 5, the fastening portion 32 is disposed at the second end of the collet fastening unit 30. The fastening portion 32 has a peripheral surface and a thread formed around the peripheral surface of the fastening portion 32. The collet receiving hole 33 is axially formed in the collet fastening unit 30.

With reference to FIGS. 4 and 5, the clamping set 40 has four clamping units 41, a sleeve 42, a compression spring 43, a blocking unit 44, and a C-ring 45. Each clamping unit 41 is spherical. The four clamping units 41 are respectively held in the two first through holes 135 and the two second through holes 136 of the assembling section 13. Two of the clamping units 41 respectively abut against bottoms of the two first recesses 312 of the clamping portion 31. The other two clamping units 41 respectively abut against bottoms of the two second recesses 313 of the clamping portion 31. The sleeve 42 is mounted around the assembling section 13. The sleeve 42 has a sleeve body 421 and an abutting portion 422. The sleeve body 421 is tubular and has an inner surface. The abutting portion 422 is disposed at the middle part of the sleeve body 421 and protrudes from the inner surface of the sleeve body 421. The compression spring 43 is held in the sleeve 42 and is mounted around the assembling section 13. The compression spring 43 has two opposite ends. One of the ends of the compression spring 43 abuts against the abutting portion 422 of the sleeve 42. The blocking unit 44 is annular. The blocking unit 44 is mounted around the assembling section 13 and abuts against the other end of the compression spring 43. The C-ring 45 is mounted in the ring groove 137 of the assembling section 13 and abuts against the blocking unit 44.

With reference to FIGS. 2, 3, and 4, the collet 50 is held in the collet receiving hole 33 of the collet fastening unit 30. The cutter 60 has a clamping end 61 and a cutting end 62 opposite the clamping end 61. The clamping end 61 is held in the collet 50. The fastening cap 70 has two opposite ends, an assembling portion 71, and a cutter through hole 72. The assembling portion 71 is disposed at one of the ends of the fastening cap 70 and has an inner surface and a thread formed on the inner surface of the assembling portion 71. The cutter through hole 72 is disposed at the other end of the fastening cap 70. The assembling portion 71 of the fastening cap 70 is screwed with the fastening portion 32 of the collet fastening unit 30.

The buffering assembly 20 received in the receiving hole 133 of the assembling section 13 has the elastic unit set 21 and the buffering unit 22. The elastic unit set 21 has multiple Belleville washers. The specifications and amount of the Belleville washers can be changed corresponding to the conditions of thread tapping. The buffering unit 22 is disposed between the elastic unit set 21 and the collet fastening unit 30 and abuts against both the elastic unit set 21 and the collet fastening unit 30, and the specific weight of the buffering unit 22 is larger than the specific weight of the body 10. Accordingly, the buffering unit 22 can absorb the power of vibration caused by tapping and reduce the load applied on the elastic unit set 21. Compared to the conventional vibration absorption cutter holder, the adjustable vibration absorption cutter holder in accordance with an embodiment of the present disclosure can be finely adjusted corresponding to practical tapping conditions and provide a sustainable vibration absorption effect.

Even though numerous characteristics and advantages of an embodiment of the present disclosure have been set forth in the foregoing description, together with details of the structure and function of an embodiment of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A cutter holder comprising:
   a body comprising
      an assembling section comprising
         a first end;
         a second end opposite the first end of the assembling section;
         a containing hole axially formed in the assembling section and comprising a terminal face away from the second end of the assembling section; and
         a receiving hole axially formed in the assembling section and communicating with the containing hole; and
      a specific weight; and
   a buffering assembly mounted in the body and comprising
      an elastic unit set having multiple Belleville washers received in the receiving hole; and
      a buffering unit received in the receiving hole and abutting against the elastic unit set, the buffering unit comprising:
         a specific weight larger than the specific weight of the body;
         a middle portion abutting against the elastic unit set and comprising
            a peripheral surface;
            two opposite side faces; and
            a receiving groove formed in the peripheral surface of the middle portion; and
         an abutting shaft extending to the containing hole and axially connected with one of the side faces of the middle portion; and
         an O-ring mounted in the receiving groove.

2. The cutter holder as claimed in claim 1, wherein:
   the buffering unit has a positioning shaft axially connected with the side face of the middle portion opposite the abutting shaft, the positioning shaft mounted through the multiple Belleville washers.

3. The cutter holder as claimed in claim 2, wherein:
   the assembling section has a positioning recess axially defined in a bottom of the receiving hole and communicating with the receiving hole; and
   the positioning shaft of the buffering unit extends in the positioning recess.

4. The cutter holder as claimed in claim 3, wherein
   the assembling section comprises:
      a fastening hole disposed between the containing hole and the receiving hole, the fastening hole axially defined in a bottom of the containing hole and communicating with both the containing hole and the receiving hole; and
   the buffering assembly comprising
      a restricting unit having a through hole axially defined through the restricting unit, wherein:
         the restricting unit is mounted around the abutting shaft of the buffering unit and is connected to the fastening hole, and the restricting unit abuts against the middle portion of the buffering unit.

5. The cutter holder as claimed in claim 4, wherein the restricting unit is screwed in the fastening hole.

6. The cutter holder as claimed in claim 5, wherein the multiple Belleville washers are implemented as four in amount.

7. The cutter holder as claimed in claim 6, wherein the buffering unit is made of tungsten alloy.

8. A cutter holder comprising:
   a body comprising:
      an assembling section comprising:
         a first end;
         a second end opposite the first end of the assembling section;
         a containing hole axially formed in the assembling section and comprising a terminal face away from the second end of the assembling section; and
         a receiving hole axially formed in the assembling section and communicating with the containing hole; and
   a buffering assembly mounted in the body and comprising:
      an elastic unit set having multiple Belleville washers received in the receiving hole;
      a buffering unit received in the receiving hole and abutting against the elastic unit set, the buffering unit comprising:
         a middle portion abutting against the elastic unit set and comprising
            a peripheral surface;
            two opposite side faces; and
            a receiving groove formed in the peripheral surface of the middle portion;
         an abutting shaft extending to the containing hole and axially connected with one of the side faces of the middle portion; and
         an O-ring mounted in the receiving groove.

* * * * *